US011972663B2

(12) United States Patent
Dufty et al.

(10) Patent No.: US 11,972,663 B2
(45) Date of Patent: Apr. 30, 2024

(54) SPORTS WAGER ENTRY WITH CUSTOMIZABLE POINT VALUE ADJUSTMENTS

(71) Applicant: IGT, Las Vegas, NV (US)

(72) Inventors: Mark Dufty, Las Vegas, NV (US); Michael Bailey, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/534,626

(22) Filed: Nov. 24, 2021

(65) Prior Publication Data

US 2023/0162561 A1 May 25, 2023

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ........ *G07F 17/323* (2013.01); *G07F 17/3211* (2013.01); *G07F 17/3288* (2013.01)

(58) Field of Classification Search

CPC ... G07F 17/32; G07F 17/3211; G07F 17/3214

USPC .............................. 463/1, 20, 22, 25, 39, 42

See application file for complete search history.

(56) References Cited

U.S. PATENT DOCUMENTS

| | | | | |
|---|---|---|---|---|
| 11,305,194 B2 * | 4/2022 | Schwartz | H04W 4/023 | |
| 2010/0279754 A1 * | 11/2010 | Tanenbaum | G06Q 50/34 | 463/3 |
| 2012/0270635 A1 * | 10/2012 | Colceri | G07F 17/3288 | 463/22 |
| 2016/0042612 A1 * | 2/2016 | Scalise | G07F 17/3244 | 463/25 |
| 2022/0139164 A1 * | 5/2022 | Huke | G06Q 50/34 | 463/26 |

* cited by examiner

*Primary Examiner* — Adetokunbo O Torimiro

(74) *Attorney, Agent, or Firm* — Sage Patent Group

(57) ABSTRACT

A processor circuit receives a sports wager entry including a predetermined number of base wagers and a predetermined number of available points. Separately, for each base wager of the predetermined number of base wagers, the processor circuit receives a base wager selection, the base wager selection associated with a predetermined point value. The processor circuit receives a point value adjustment selection and adjusts the predetermined point value by the selected point value adjustment to generate an adjusted point value, wherein a sum of the selected point value adjustments for the predetermined number of base wagers does not exceed the predetermined number of available points. The processor circuit displays, at the display device, an indication of the adjusted point value. The processor circuit stores a sports wager entry record comprising the base wager selections and the adjusted point values for the sport wager entry.

20 Claims, 8 Drawing Sheets

| Football | | |
|---|---|---|
| **No. of Selections** | **Total Points** | **Odds** |
| 2 | 11 | -130 |
| 3 | 16 | +150 |
| 4 | 22 | +250 |
| 5 | 27 | +400 |
| 6 | 32 | +600 |
| 7 | 38 | +1250 |
| 8 | 43 | +1250 |
| 9 | 48 | +1700 |
| 10 | 54 | +2200 |

| Basketball | | |
|---|---|---|
| **No. of Selections** | **Total Points** | **Odds** |
| 2 | 8 | -130 |
| 3 | 12 | +160 |
| 4 | 16 | +250 |
| 5 | 20 | +400 |
| 6 | 24 | +600 |
| 7 | 27 | +1000 |
| 8 | 30 | +1500 |
| 9 | 33 | +2500 |
| 10 | 36 | +3200 |

*FIG. 3*

SPORTS WAGER ENTRY WITH CUSTOMIZABLE POINT VALUE ADJUSTMENTS

BACKGROUND

Embodiments described herein relate to game play features for sports wagers, and in particular to customizable point value adjustments for sports wager entry, such as in a casino environment, and/or mobile wagering environment, and related devices, systems, and methods.

Live sporting events have many aspects that make them attractive to spectators, both from an entertainment standpoint and a wagering and/or betting standpoint. Many types of sports wagers allow a player to place a single wager tied to the outcomes of multiple sporting events. As technology improves and as the competition for the attention of bettors and spectators increases, there is a need for additional customization features that increase player involvement and excitement.

BRIEF SUMMARY

According to some embodiments, a system includes a processor circuit and a memory including machine-readable instructions. When executed by the processor circuit, the instructions cause the processor circuit to receive a sports wager entry comprising a predetermined number of base wagers and a predetermined number of available points. The instructions further cause the processor circuit to display, at a display device, an indication of the predetermined number of base wagers and a predetermined number of available points. The instructions further cause the processor circuit to separately, for each base wager of the predetermined number of base wagers, receive a base wager selection, the base wager selection associated with a predetermined point value. The instructions further cause the processor circuit to display, at the display device, an indication of the base wager selection and the predetermined point value. The instructions further cause the processor circuit to receive a point value adjustment selection. The instructions further cause the processor circuit to adjust the predetermined point value by the selected point value adjustment to generate an adjusted point value, wherein a sum of the selected point value adjustments for the predetermined number of base wagers does not exceed the predetermined number of available points. The instructions further cause the processor circuit to display, at the display device, an indication of the adjusted point value. The instructions further cause the processor circuit to store a sports wager entry record comprising the base wager selections and the adjusted point values for the sport wager entry.

According to some embodiments, a gaming device includes a display device, an input device, a processor circuit, and a memory including machine-readable instructions. When executed by the processor circuit, the instructions cause the processor circuit to receive a sports wager entry at the input device, the sports wager entry comprising a predetermined number of base wagers and a predetermined number of available points. The instructions further cause the processor circuit to display, at the display device, an indication of the predetermined number of base wagers and a predetermined number of available points. The instructions further cause the processor circuit to, separately, for each base wager of the predetermined number of base wagers, receive a base wager selection at the input device, the base wager selection comprising a predetermined point value. The instructions further cause the processor circuit to display, at the display device, an indication of the base wager selection and the predetermined point value. The instructions further cause the processor circuit to receive a point value adjustment selection at the input device. The instructions further cause the processor circuit to adjust the predetermined point value by the selected point value adjustment to generate an adjusted point value, wherein a sum of the selected point value adjustments for the predetermined number of base wagers does not exceed the predetermined number of available points. The instructions further cause the processor circuit to display, at the display device, an indication of the adjusted point value. The instructions further cause the processor circuit to receive, at the input device, a confirmation indication for the sports wager entry comprising the base wager selections and the adjusted point values.

According to some embodiments, a method includes receiving a sports wager entry at an input device of a gaming device, the sports wager entry comprising a predetermined number of base wagers and a predetermined number of available points. The method further includes displaying, at a display device, an indication of the predetermined number of base wagers and a predetermined number of available points. The method further includes separately, for each base wager of the predetermined number of base wagers. The method further includes receiving a base wager selection at the input device, the base wager selection comprising a predetermined point value. The method further includes displaying, at the display device, an indication of the base wager selection and the predetermined point value. The method further includes receiving a point value adjustment selection at the input device, the base wager selection comprising a predetermined point value. The method further includes adjusting the predetermined point value by the selected point value adjustment to generate an adjusted point value, wherein a sum of the selected point value adjustments for the predetermined number of base wagers is equal to the predetermined number of available points. The method further includes displaying, at the display device, an indication of the adjusted point value. The method further includes resolving the sports wager entry based on the base wager selections and the adjusted point values for the predetermined number of base wagers and a plurality of base wager outcomes for the predetermined number of base wagers.

BRIEF DESCRIPTION OF SEVERAL VIEWS OF THE DRAWINGS

FIG. 3 illustrates a graphical user interface (GUI) for placing a multi-game sports wager with customizable point value adjustments, according to some embodiments.

DETAILED DESCRIPTION

Embodiments described herein relate to game play features for sports wagers, and in particular to customizable point value adjustments for sports wager entries, such as in a casino environment, and/or mobile wagering environment, and related devices, systems, and methods.

In a standard teaser wager, a single predetermined point value adjustment is applied to all of the selected games in the wager. For example, a 3-team teaser might pay +180 (i.e., lay $100 to win $180) to adjust each game's predetermined point value (e.g., point spread and/or over/under) by exactly 6 points. To win the teaser, the player must correctly pick the winner of all three selected games. While the payout odds may vary for different types of standard teaser wagers, the payout odds for each type of standard teaser wagers for various sports generally conform to standard amounts within the industry. This allows for a more predictable house edge, but one drawback of standard teaser wagers is a lack of flexibility and options for players.

According to embodiments disclosed herein, multi-game sports wagers are provided that allow for a player to customize the point value adjustments for individual games within the wager. For example, in a football teaser wager with customizable point value adjustments, a player may be provided a pool of points (or half-points, etc.) that can be assigned to the different games in any combination. For example, a 3-team football teaser with a 16-point pool may adjust the individual games by 6, 6, and 4 points, 2, 4, and 10 points, 5, 7, and 4 points, etc., or any other combination, as desired. In some examples, normal teaser rules would apply, such as ties reducing down, ties with a winner or a loser in a 2-team teaser constituting no action, etc.

Figure 1:
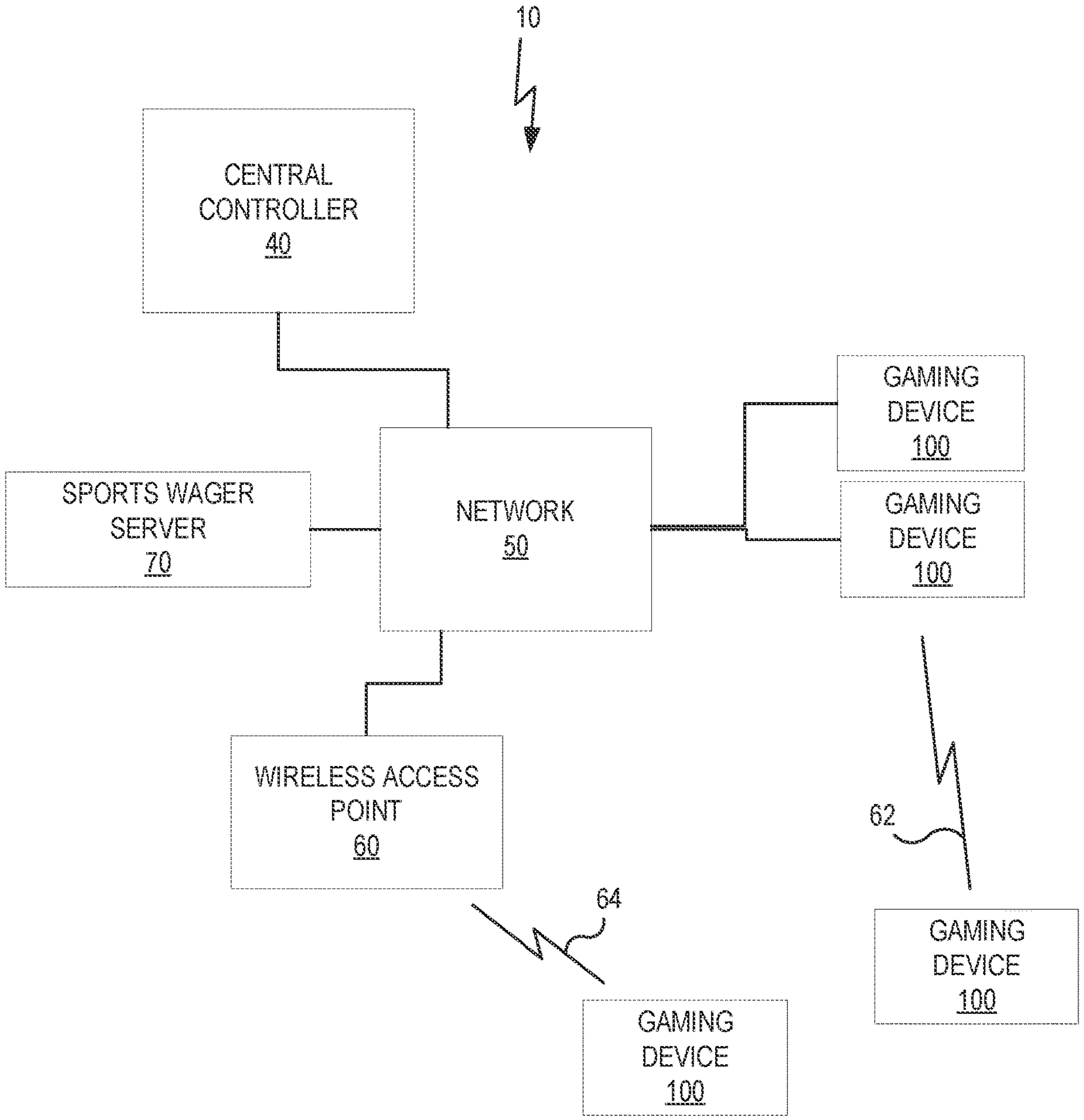
FIG. 1 is a schematic block diagram illustrating a network configuration for a plurality of gaming devices according to some embodiments.

Embodiments disclosed herein can be implemented manually or electronically. In this regard, FIG. 1 illustrates a gaming system 10 including a plurality of gaming devices 100. The gaming devices 100 may be one type of a variety of different types of gaming devices, such as electronic gaming machines (EGMs), electronic sports betting kiosks, mobile gaming devices, or other devices, for example. The gaming system 10 may be located, for example, on the premises of a gaming establishment, such as a permitted betting location. The gaming devices 100, which may also be typically situated in a permitted betting location, such as on a casino floor and/or in a casino sports book for example. The gaming device 100 may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

In this example, a sports wager server 70 controls and manages sports wagers, such as multi-game sports wagers for example, across multiple gaming devices 100. In this simplified example, the eligible gaming devices 100 are interconnected though a common data communication network 50, but as will be described in greater detail below, it should be understood that eligible gaming devices 100 may facilitate sports wagering across a plurality of networks, which located across different locations, properties, and/or jurisdictions, etc.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. Some embodiments provide that gaming devices 100 may communicate with other gaming devices over a wireless interface 64. In these embodiments, wireless interface 62 and/or wireless interface 64 may use different communication protocols and/or different communication resources, such as different frequencies, time slots, spreading codes, etc.

Figure 2:
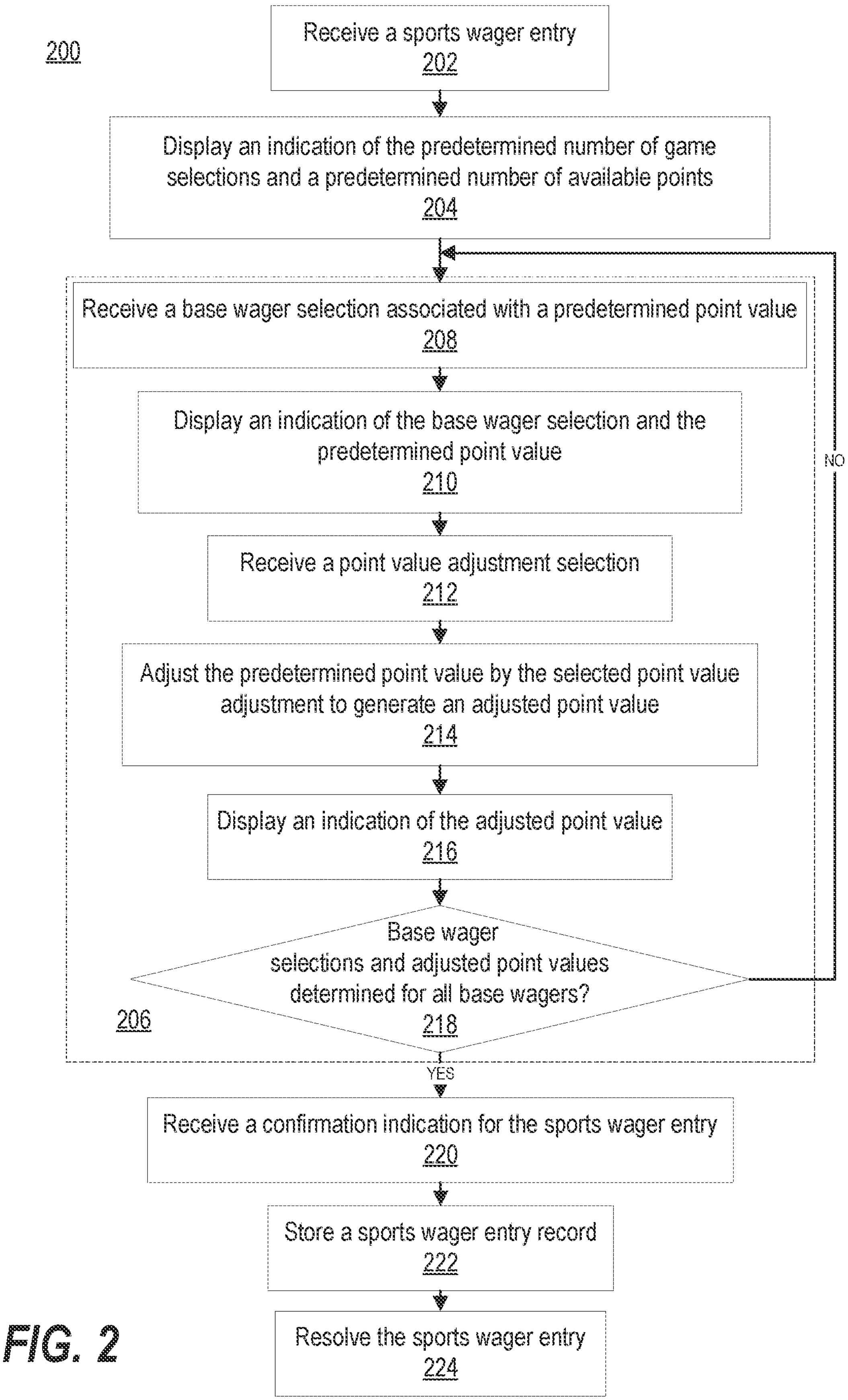
FIG. 2 is a flowchart illustrating operations of systems/methods of facilitating sports wagering, according to some embodiments.

FIG. 2 is a flowchart illustrating operations 200 of systems/methods of facilitating sports wagering, according to some embodiments. The operations 200 may include receiving a sports wager entry comprising a predetermined number of base wagers and a predetermined number of available points (Block 202), and displaying, at a display device, an indication of the predetermined number of base wagers and a predetermined number of available points (Block 204). In this regard, FIG. 3 illustrates a graphical user interface (GUI) 300 for placing a multi-game sports wager with customizable point value adjustments, according to some embodiments. The GUI 300 includes a wager selection menu 302 with a listing of selectable wagers 304. Each available wager 304 includes a predetermined number 306 of base wagers, a predetermined number of available points 308, and predetermined payout odds 310, in different combinations.

The GUI 300 of FIG. 3 includes groupings of selectable wagers 304 by different sports, e.g., football wagers 312, basketball wagers 314, etc., with different payout odds 310 for different combinations of numbers 306 of base wagers and numbers of available points 308. For some sports, such as football, there are certain key numbers associate with common margins of victory. In football, for example, because points are most often scored in multiples of 3, 6, and 7, it may be advantageous for a player to apply point value adjustments in multiples of 3, 6, or 7 to maximize the player's chances of winning all of the base wagers. To compensate for tendency of certain combinations of key numbers to skew the odds of certain base wager/point combinations, the number of available points 308 in each selectable wager 304 may be selected so that it is not divisible by 3, 6, 7, or any other key number, as desired, so as to prevent a player from adjusting all of the base wagers by one or more of these key numbers. Alternatively, or in addition, the payout odds 310 for a given wager 304 may be adjusted to compensate for the player's increased likelihood of winning based on optimal point value adjustments. In this embodiment, for example, the selectable football wagers 312 include the following combinations:

2 game selections (i.e., base wagers), with 11 available points;
3 game selections, with 16 available points;
4 game selections, with 22 available points;
5 game selections, with 27 available points;
6 game selections, with 32 available points;
7 game selections, with 38 available points;
8 game selections, with 43 available points;
9 game selections, with 48 available points; and
10 game selections, with 54 available points.

In this example, the selectable basketball wagers 314 include the following combinations:

2 game selections, with 8 available points;
3 game selections, with 12 available points;
4 game selections, with 16 available points;
5 game selections, with 20 available points;
6 game selections, with 24 available points;
7 game selections, with 27 available points;
8 game selections, with 30 available points;
9 game selections, with 33 available points; and
10 game selections, with 36 available points.

Figure 4:
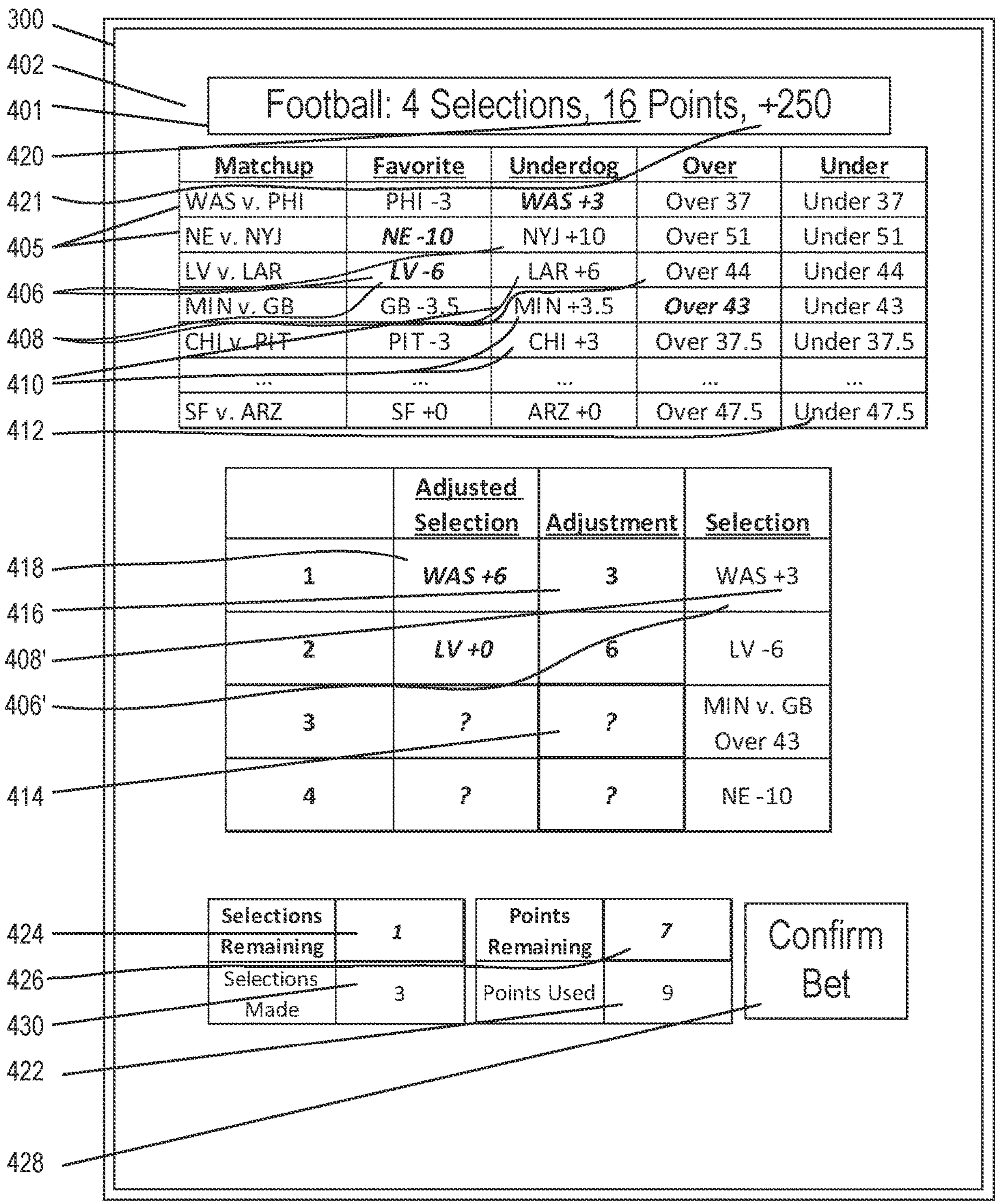
FIG. 4 illustrates selection of a plurality of games and point value adjustments for a football teaser wager with customizable point value adjustments using the GUI of FIG. 3, according to some embodiments.

Referring back to FIG. 2, the operations 200 may further include iterative sub-operations 206 for each base wager of the predetermined number of base wagers. The sub-operations 206 may include receiving a base wager selection associated with a predetermined point value (Block 208). In this regard, FIG. 4 illustrates selection a plurality of base wagers and point value adjustments for a football teaser wager 401 with customizable point value adjustments using the GUI 300 of FIG. 3, according to some embodiments. In this example, FIG. 4 illustrates a game selection menu 402 provides a listing of upcoming games 405 and associated available base wagers 406 for each upcoming game 405. Each game 405 may include a plurality of available base wagers 406 and associated predetermined point values 408, such as betting the favorite or the underdog against a predetermined point spread 410, or betting over or under a predetermined point total 412, for example. It should also be understood that it is not necessary to restrict the groupings of selectable wagers 304 in FIG. 3 or the available base wagers 406 in FIG. 4 to a single sport. For example, certain selectable wagers may include available base wagers for both football and basketball (e.g., bets against the spread and/or point totals), with a common pool of points being available to adjust different base wagers from the different sports as desired.

Referring back to FIG. 2, the sub-operations 206 may further include displaying, at the display device, an indication of the base wager selection and the predetermined point value (Block 210). As shown in FIG. 4, in response to receiving a selection of a particular base wager 406' (WAS +6 in this example), the GUI 300 displays an indication of the selected base wager 406' and the predetermined point value 408', and a point value adjustment field 414. The sub-operations 206 may further include receiving a point value adjustment selection (Block 212), adjusting the predetermined point value by the selected point value adjustment to generate an adjusted point value (Block 214), and displaying, at the display device, an indication of the adjusted point value (Block 216). For example, as shown by FIG. 4, a three-point adjustment 416 is added to the predetermined point value 408' to generate a nine-point adjusted point value 418. In this example, the point value adjustment is added to or subtracted from the predetermined point value 408' automatically to generate an adjusted point value 418 that is more favorable to the player. For example, if the base wager 406 is a bet against a predetermined point spread, the selected point value adjustment is added to the point spread to either increase a positive point spread, or to reduce a negative point spread (and possibly convert a negative point spread to a positive adjusted point spread). If the base wager is a bet on the over, the predetermined point total is reduced by the selected point value adjustment. If the base wager is a bet on the under, the predetermined point total is increased by the selected point value adjustment.

In this example, the predetermined point value of each base wager of the predetermined number of games can be a predetermined point spread and/or a predetermined point total, with the adjusted point value of each base wager being an adjusted point spread and/or adjusted point total, respectively. In this example, the predetermined point values and the point values adjustments are expressible as one of an integer and a half-integer, consistent with standard sports wagering conventions. In some embodiments, however, the predetermined point values and/or point values adjustments may be expressible as integers only, as decimals, and/or as fractions, etc., as desired.

Referring back to FIG. 2, the sub-operations 206 may further include determining whether base wager selections and adjusted point values have been determined for all of the predetermined number of games (Block 218), and iteratively repeating operations 208-216 for each game of the predetermined number of games until all base wager selections and adjusted point values have been determined. As shown in FIG. 4 for example, the GUI 300 displays an indication of the total number of available points 420 for the wager, the number of selected base wagers 430, the number of points already applied 422 to selected base wagers 406, the number of remaining base wagers 424 to be selected, and the number of remaining points 426 available to adjust the predetermined point values 408 of the remaining base wagers 406 to be selected. In this example, a sum of the selected point value adjustments for the predetermined number of games, i.e., the number of points applied 422, does not exceed the total number of available points 420. In this example, the payout odds 421 for the selected football teaser wager 401 are predetermined, allowing the player to attempt to optimize the point value adjustments 416 to maximize the likelihood of winning the wager 401 without affecting the payout odds value 421. In some examples, however, the payout odds value may be dynamically adjusted in response to different point value adjustment selections. For example, a point value adjustment that meets or exceeds a predetermined threshold may reduce the payout odds for the overall sports wager entry, to compensate for an increased likelihood of winning for the player.

After base wager selections and adjusted point values have been determined for all of the predetermined number of games, the operations 200 of FIG. 2 may further include receiving, at the input device, a confirmation indication for the sports wager entry comprising the base wager selections and the adjusted point values (Block 220). As shown by FIG. 4, for example, the GUI 300 includes an entry confirmation button 428 to confirm that the wager is complete and generate a finalized sports wager entry. The operations 200 of FIG. 2 may further include storing a sports wager entry record comprising the base wager selections and the adjusted point values for the sport wager entry (Block 222), for example in the sports wager server 70 of FIG. 1.

Figure 5A:
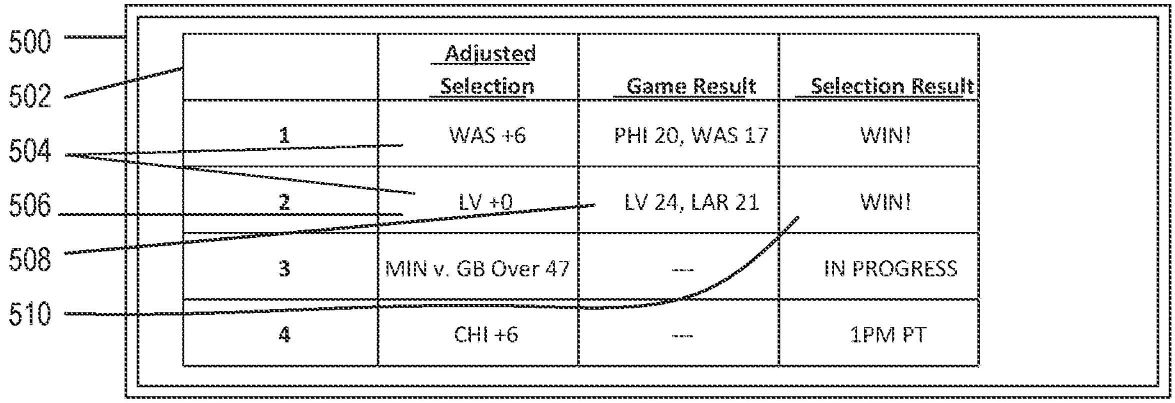
FIGS. 5A-5C illustrate a GUI for displaying game results and wager results for the football teaser wager of FIG. 4, according to some embodiments.
Figure 5B:
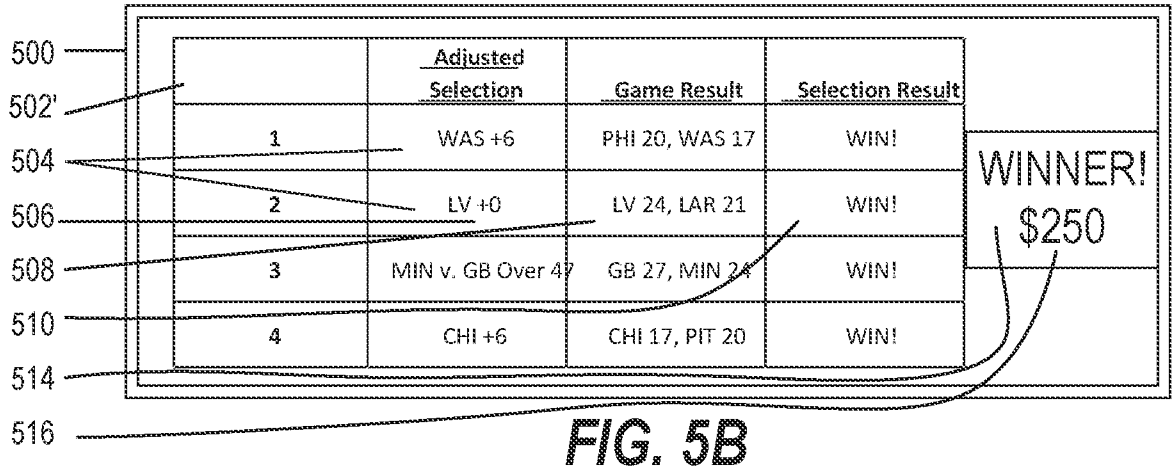
Figure 5C:
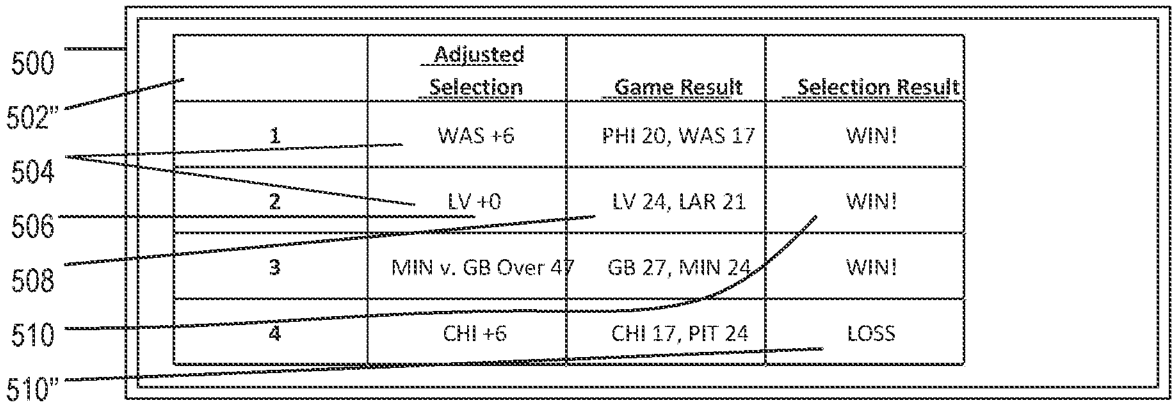

The operations 200 of FIG. 2 may further include resolving the sports wager entry based on the base wager selections and the adjusted point values for the predetermined number of games and a plurality of game outcomes for the predetermined number of games (Block 224). In this regard, FIGS. 5A-5C illustrate a GUI 500 for providing status and outcome information about an existing sports wager entry 502 (corresponding to the finalized sports wager entry of FIG. 4 in this example), including statuses and outcomes for the individual base wagers 504 and associated adjusted point values 506. For each base wager 504, the adjusted point value 506 of the base wager 504 is compared to an actual result 508 (e.g., an actual point value) of the associated game to determine a base wager outcome 510 if the base wager, i.e., whether the base wager results in a winning result, losing result, or a tie/draw (which may be considered a winning or losing result for the purposes of resolving the sports wager entry 502, depending on the wager rules). For example, as discussed above, the wager rules may require that all of the base wager outcomes 510 must be winning outcomes for the sports wager entry 502 to win. For example, FIG. 5B illustrates a winning sports wager entry 502', in which all of the base wager outcomes 510 are winning outcomes. In response to a determination the sports wager entry 502 is a winning sports wager entry, a result indication 514 is provided, including an indication of a payout 516 based on the payout odds value 516 associated with the sports wager entry 502. FIG. 5C illustrates a losing sports wager entry 502", in which not all of the base wager outcomes 510 are winning base wager outcomes, e.g., at least one base wager outcome 510" is a losing base wager outcome.

Figure 6A:
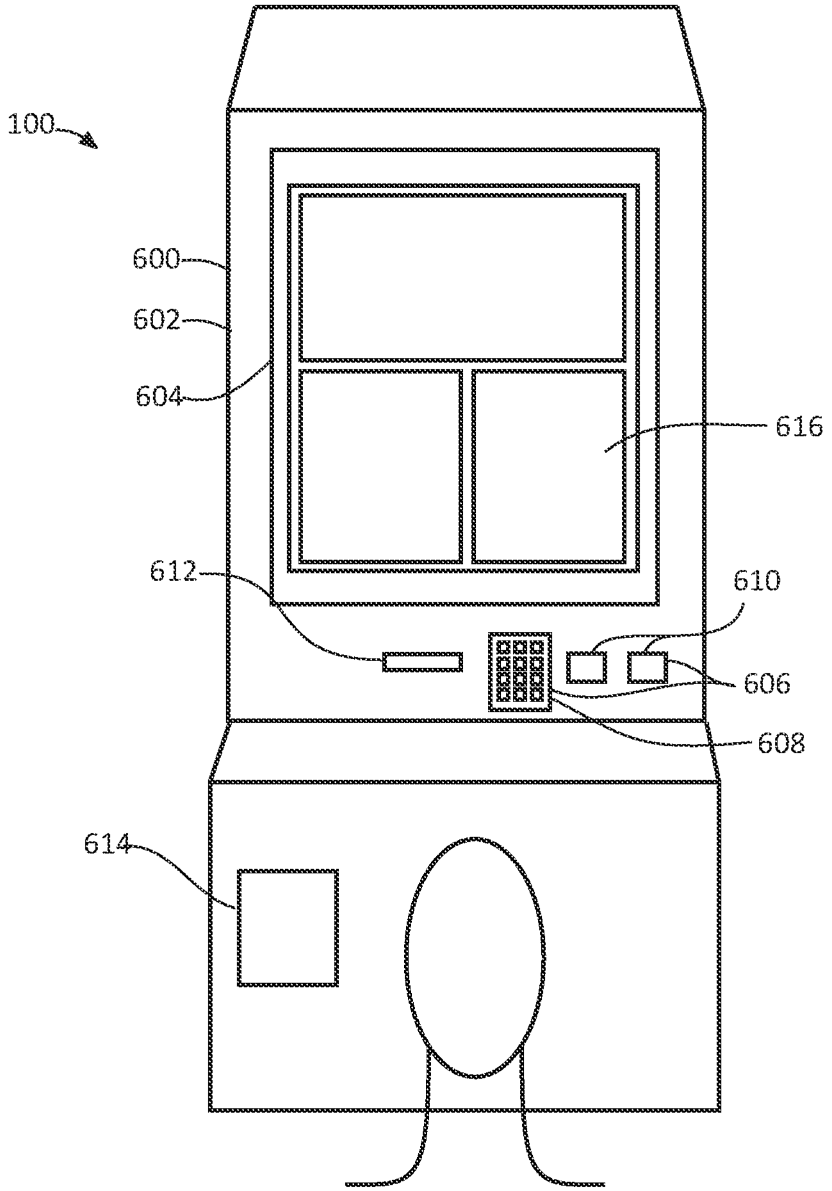
FIG. 6A is a perspective view of a gaming device that can be configured according to some embodiments.
Figure 6B:
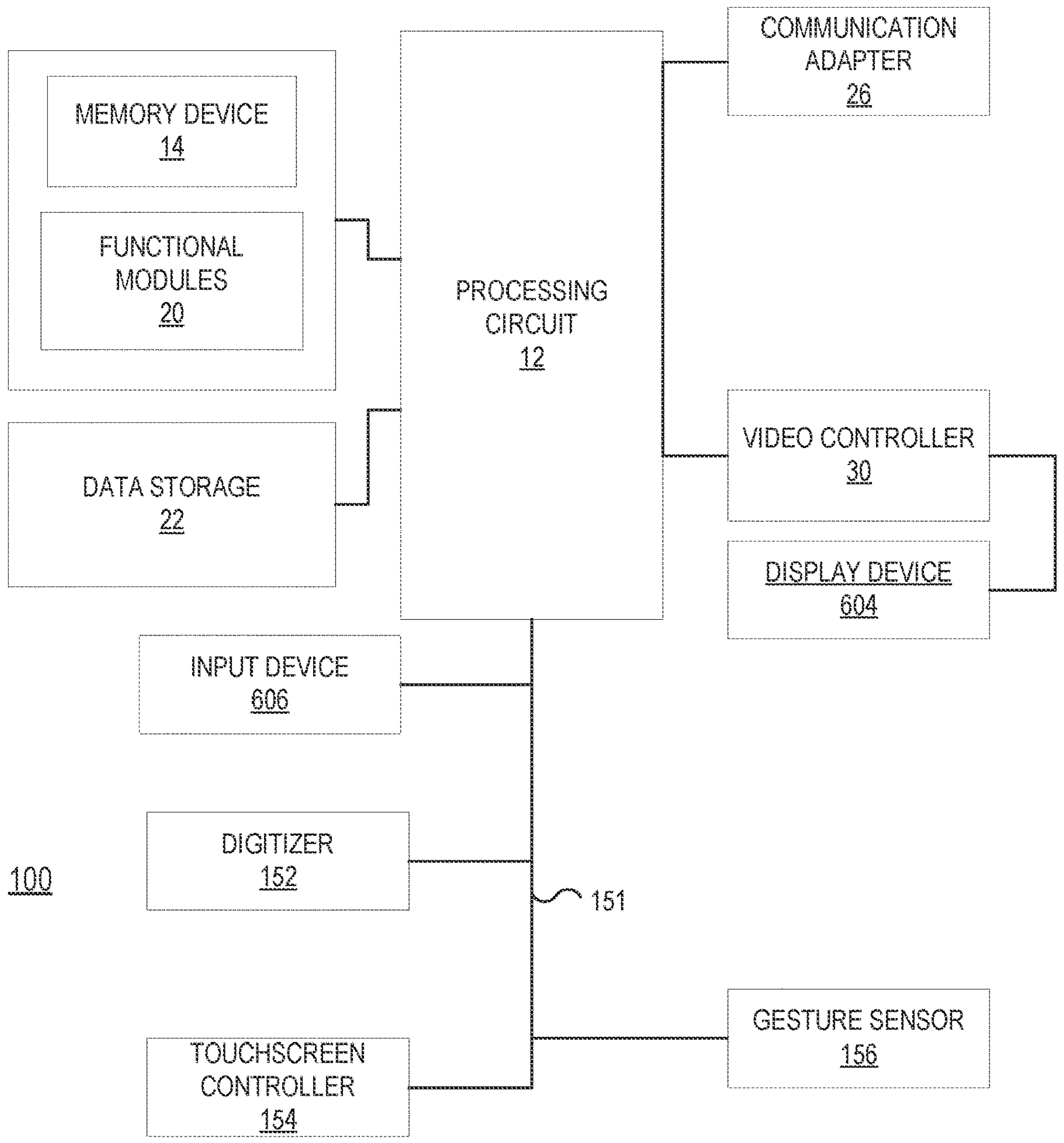
FIG. 6B is a schematic block diagram illustrating an electronic configuration for a gaming device according to some embodiments.
Figure 6C:
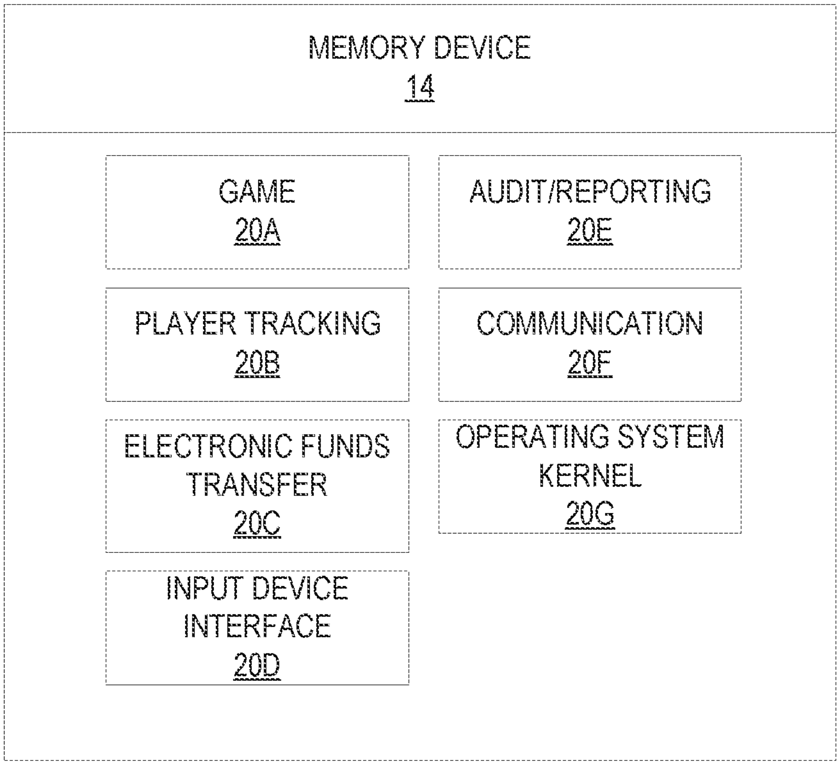
FIG. 6C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 6A, 6B, and 6C in which FIG. 6A is a perspective view of a gaming device 100 illustrating various physical features of the device, FIG. 6B is a functional block diagram that schematically illustrates an electronic relationship of various elements of the gaming device 100, and FIG. 6C illustrates various functional modules that can be stored in a memory device of the gaming device 100. The embodiments shown in FIGS. 6A to 6C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 6A and 6B. In this regard, FIG. 6A illustrates a gaming device 100 embodied in a dedicated gaming terminal 600, but it should be understood that other types of gaming devices, such as EGMs, sports gaming kiosks, mobile devices, tablets, smartphones, or other devices, may provide similar functionality for implementing features disclosed herein. In some embodiments, the gaming device 100 includes a housing 602 having a display device 604, and a plurality of input devices 606, such as a keypad 608, buttons 610, etc., for receiving user input for playing the wagering game and otherwise interacting with the gaming device 100. In some embodiments, the display device 604 may include a touch-screen interface for receiving user input as well. The display device 604 may also be a single display device or may include multiple display devices, such as a first display device for displaying video of the live sporting event and a second display device for displaying gaming and wagering information for example. The gaming device 100 may include additional specialized hardware as well, such as an acceptor 612, for receiving currency (i.e., bills and/or coins), tokens, credit or debit cards, or other physical items associated with monetary or other value. The gaming device 100 may also include a dispenser 614, for dispensing items, such as physical items having monetary or other value (e.g., awards or prizes) or other items.

The gaming device 100 may include a processor circuit and a memory coupled to the processor circuit. The memory may include machine-readable instructions that, when executed by the processor circuit, cause the processor circuit to perform operations for operating the gaming device 100 and/or other features described herein. In this example, the gaming terminal 600 may include a graphical user interface (GUI) 616 displayed by the display device 604 for providing the video and gaming information to the player.

In some embodiments, as shown in FIG. 6B, the input device(s) 606 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on the display device 604. Accordingly, any of the above-described input devices 606 may be provided as virtual buttons or regions on one or more of the display device 604.

Referring briefly to FIG. 6B, operation of the display device 604 may be controlled by a video controller 30 that receives video data from a processing circuit 12 or directly from a memory device 14 and displays the video data on the display screen.

Referring again to FIG. 6A, the display device 604 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device 604 may include a touch-screen with an associated touchscreen controller 154 and digitizer 152. The display device 604 may be of any suitable size, shape, and/or configuration. The display device 604 may include flat or curved display surfaces.

FIG. 6B is a block diagram that illustrates logical and functional relationships between various components of a gaming device 100. It should also be understood that components described in FIG. 6B may also be used in other computing devices, as desired, such as mobile computing devices, personal computers, lottery terminals, or other network-connected devices, for example. As shown in FIG. 6B, the gaming device 100 may include a processing circuit 12 (also referred to as a processor circuit herein) that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 6B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 6D.

The memory device 14 may store program code and instructions, executable by the processing circuit 12, to control the gaming device 100. The memory device 14 may also store other data such as image data, event data, player input data, and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

Various functional modules of that may be stored in a memory device 14 of a gaming device 100 are illustrated in FIG. 6C. Referring to FIG. 6C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, and an operating system kernel 20G. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules.

In some embodiments, a gaming device 100 includes a personal device, such as a desktop computer, a laptop computer, a mobile device (e.g., mobile phone or smartphone), a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. For example, a gaming device 100 may be a personal mobile phone that accesses the wireless gaming system via a mobile app downloaded to the device from an app store or other software marketplace or repository, which facilitates game play, registration, and/or authentication, etc. for the wireless gaming system. It should be appreciated that a gaming device or gaming machine as disclosed herein may be a device that has obtained approval from a regulatory gaming commission or a device that has not obtained approval from a regulatory gaming commission.

Figure 6D:
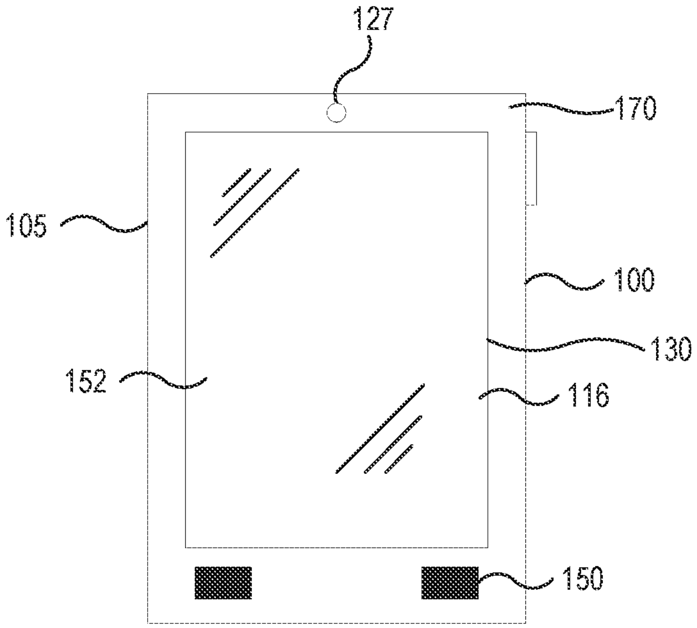
FIG. 6D is perspective view of a gaming device that can be configured according to some embodiments.

For example, referring to FIG. 6D, a gaming device 100 (which is a mobile gaming device 170 in this embodiment) may be implemented as a handheld device including a compact housing 105 on which is mounted a touchscreen display device 116 including a digitizer 152. One or more input devices 130 may also be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Embodiments described herein may be implemented in various configurations for gaming devices 100, including but not limited to: (1) a dedicated gaming device, wherein the computerized instructions for controlling any games (which are provided by the gaming device) are provided with the gaming device; and (2) a changeable gaming device, where the computerized instructions for controlling any games (which are provided by the gaming device) are downloadable to the gaming device through a data network. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a processor circuit; and a memory comprising machine-readable instructions that, when executed by the processor circuit, cause the processor circuit to:

receive a sports wager entry comprising a predetermined number of base wagers and a predetermined number of available points;

display, at a display device, an indication of the predetermined number of base wagers and a predetermined number of available points;

separately, for each base wager of the predetermined number of base wagers:

receive a base wager selection, the base wager selection associated with a predetermined point value;

display, at the display device, an indication of the base wager selection and the predetermined point value;

receive a point value adjustment selection;

adjust the predetermined point value by the selected point value adjustment to generate an adjusted point value, wherein a sum of the selected point value adjustments for the predetermined number of base wagers does not exceed the predetermined number of available points; and display, at the display device, an indication of the adjusted point value; and store a sports wager entry record comprising the base wager selections and the adjusted point values for the sport wager entry.

2. The system of claim 1, wherein the predetermined point value of each base wager of the predetermined number of base wagers comprises a predetermined point spread and the adjusted point value of each base wager of the predetermined number of base wagers comprises an adjusted point spread.

3. The system of claim 1, wherein the predetermined point value of each base wager of the predetermined number of base wagers comprises a predetermined point total and the adjusted point value of each base wager of the predetermined number of base wagers comprises an adjusted point total.

4. The system of claim 1, wherein the instructions further cause the processor circuit to:

prior to receiving the sports wager entry, provide a list of available sports wagers, each sports wager comprising:

a different combination of a predetermined number of base wagers and a predetermined number of points, and a payout odds value, wherein the sports wager entry comprises a selection of one of the available sports wagers.

5. The system of claim 1, wherein the instructions further cause the processor circuit to:

based on the point value adjustment selection for one of the predetermined number of base wagers adjust a payout odds value of the sports wager.

6. The system of claim 1, wherein the predetermined number of base wagers comprises a predetermined number of football game wagers, and wherein the predetermined number of available points is not divisible by 6.

7. The system of claim 6, wherein the predetermined number of football game wagers is two football game wagers, and wherein the predetermined number of available points is 11.

8. The system of claim 6, wherein the predetermined number of football game wagers is three football game wagers, and wherein the predetermined number of available points is 16.

9. The system of claim 6, wherein the predetermined number of football game wagers is four football game wagers, and wherein the predetermined number of available points is 22.

10. The system of claim 6, wherein the predetermined number of available points is not divisible by 3.

11. The system of claim 1, wherein the instructions further cause the processor circuit to resolve the sports wager entry based on the base wager selections and the adjusted point values for the predetermined number of base wagers and a plurality of base wager outcomes for the predetermined number of base wagers.

12. The system of claim 11, wherein the instructions that cause the processor circuit to resolve the sports wager entry cause the processor circuit to:

for each base wager of the plurality of base wagers, compare the adjusted point value for the base wager to an actual point value associated with the base wager; and for each base wager of the plurality of base wagers, determine whether the base wager outcome is a winning base wager outcome.

13. The system of claim 12, wherein the instructions that cause the processor circuit to resolve the sports wager entry cause the processor circuit to:

determine whether all of the base wager outcomes for the plurality of base wagers are winning base wager outcomes; and in response to a determination that all of the base wager outcomes are winning base wager outcomes, determine that the sports wager entry is a winning sports wager entry, and provide a payout based on a payout odds value associated with the sports wager entry.

14. The system of claim 13, wherein the instructions that cause the processor circuit to resolve the sports wager entry cause the processor circuit to:

in response to a determination that not all of the base wager outcomes are winning base wager outcomes, determine that the sports wager entry is a losing sports wager entry.

15. The system of claim 1, wherein each point value adjustment selection is expressible as an integer.

16. The system of claim 1, wherein each point value adjustment is expressible as one of an integer and a half-integer.

17. A gaming device comprising:

a display device;

an input device;

a processor circuit; and a memory comprising machine-readable instructions that, when executed by the processor circuit, cause the processor circuit to:

receive a sports wager entry at the input device, the sports wager entry comprising a predetermined number of base wagers and a predetermined number of available points;

display, at the display device, an indication of the predetermined number of base wagers and a predetermined number of available points;

separately, for each base wager of the predetermined number of base wagers:

receive a base wager selection at the input device, the base wager selection comprising a predetermined point value;

display, at the display device, an indication of the base wager selection and the predetermined point value;

receive a point value adjustment selection at the input device;

adjust the predetermined point value by the selected point value adjustment to generate an adjusted point value, wherein a sum of the selected point value adjustments for the predetermined number of base wagers does not exceed the predetermined number of available points; and display, at the display device, an indication of the adjusted point value; and receive, at the input device, a confirmation indication for the sports wager entry comprising the base wager selections and the adjusted point values.

18. The gaming device of claim 17, wherein the predetermined point value of each base wager of the predetermined number of base wagers comprises one of a predetermined point spread and a predetermined point total, and wherein the adjusted point value of each base wager of the predetermined number of base wagers comprises one of an adjusted point spread and an adjusted predetermined point total.

19. A gaming device comprising:

a processor circuit;

a memory coupled to the processor circuit, the memory comprising machine-readable instructions to operate the processor circuit;

a network interface coupled to the processor circuit to retrieve, from a remote server, a plurality of base wagers for a sports wager, each base wager associated with a sporting event;

a display device coupled to the processor circuit to display a graphical user interface (GUI) comprising an indication of the plurality of base wagers and an indication of a predetermined number of available points for the sports wager;

an input device coupled to the processor circuit to receive:

a base wager selection of a predetermined number of base wagers of the plurality of base wagers, each base wager of the base sager selection associated with a predetermined point value; and a point value adjustment selection for each base wager of the base wager selection, wherein receipt of the point value adjustment selection for each base wager of the a base wager selection causes the processor circuit to adjust the predetermined point value of the base wager by the selected point value adjustment to generate an adjusted wager selection comprising the base wager selection and an adjusted point value for each base wager of the a base wager selection, wherein a sum of the selected point value adjustments for the predetermined number of base wagers does not exceed the predetermined number of available points; and wherein the instructions further cause the processor circuit to:

cause the memory to store a sports wager entry record comprising the adjusted wager selection;

cause the network interface to receive a sporting event result from the remote server for each sporting event associated with the adjusted wager selection;

determine, based on the sporting event results, a wager result for the adjusted wager selection; and determine whether the wager result is successful; and a dispenser device coupled to the processor circuit to, based on a determination by the processor circuit that the wager result is successful, dispense an award to the player.

20. The gaming device of claim 19, wherein the predetermined point value of each base wager of the base wager selection comprises one of a predetermined point spread and a predetermined point total, and wherein the adjusted point value of each base wager of the adjusted wager selection comprises one of an adjusted point spread and an adjusted predetermined point total.

* * * * *